United States Patent
Yoda et al.

(10) Patent No.: US 12,094,210 B2
(45) Date of Patent: *Sep. 17, 2024

(54) MONITORING SYSTEM, MONITORING DEVICE, MONITORING METHOD, AND NON-TRANSITORY COMPUTER-READABLE MEDIUM

(71) Applicant: NEC Corporation, Tokyo (JP)

(72) Inventors: Yukihide Yoda, Tokyo (JP); Yoshiaki Aono, Tokyo (JP); Koji Asahi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 463 days.

This patent is subject to a terminal disclaimer.

(21) Appl. No.: 17/439,987

(22) PCT Filed: Jan. 14, 2020

(86) PCT No.: PCT/JP2020/000889
§ 371 (c)(1),
(2) Date: Sep. 16, 2021

(87) PCT Pub. No.: WO2020/202694
PCT Pub. Date: Oct. 8, 2020

(65) Prior Publication Data
US 2022/0172479 A1    Jun. 2, 2022

(30) Foreign Application Priority Data
Mar. 29, 2019   (JP) ................................ 2019-068645

(51) Int. Cl.
*G06V 20/52*    (2022.01)
*G06V 40/20*    (2022.01)
(Continued)

(52) U.S. Cl.
CPC .............. *G06V 20/52* (2022.01); *G06V 40/25* (2022.01); *G08B 13/186* (2013.01); *G08B 13/22* (2013.01)

(58) Field of Classification Search
None
See application file for complete search history.

(56) References Cited

U.S. PATENT DOCUMENTS

| 4,297,684 A | * 10/1981 | Butter .................. G08B 13/124 367/136 |
| 6,072,612 A | 6/2000 | Liou et al. |

(Continued)

FOREIGN PATENT DOCUMENTS

| CN | 1741027 A | 3/2006 |
| CN | 1809041 A | 7/2006 |

(Continued)

OTHER PUBLICATIONS

Extended European Search Report for EP Application No. 20784720.3 dated on Oct. 13, 2022.

(Continued)

*Primary Examiner* — Fekadeselassie Girma

(57) ABSTRACT

A monitoring system according to the present disclosure includes an optical fiber (10) laid in a monitoring area; an authenticating unit (20) configured to authenticate a person or a vehicle passing through a gate (G) for entering the monitoring area; an optical fiber sensing unit (31) configured to acquire, based on an optical signal received from the optical fiber (10), a parameter having a unique pattern corresponding to the pattern of action of the authenticated person or vehicle; and an analyzing unit (32) configured to identify the pattern of action of the authenticated person or vehicle based on the unique pattern of the parameter.

13 Claims, 14 Drawing Sheets

(51) Int. Cl.
G08B 13/186 (2006.01)
G08B 13/22 (2006.01)

(56) References Cited

U.S. PATENT DOCUMENTS

| | | | |
|---|---|---|---|
| 10,636,264 B2* | 4/2020 | Huang | G06N 3/08 |
| 2005/0223464 A1* | 10/2005 | Huang | A41D 13/01 |
| | | | 2/102 |
| 2006/0083458 A1* | 4/2006 | Iffergan | G08B 13/124 |
| | | | 385/13 |
| 2010/0097234 A1* | 4/2010 | Eslambolchi | G08B 13/186 |
| | | | 340/653 |
| 2011/0249252 A1 | 10/2011 | Lantz et al. | |
| 2012/0176496 A1 | 7/2012 | Carbonell et al. | |
| 2012/0214515 A1 | 8/2012 | Davis et al. | |
| 2013/0092371 A1* | 4/2013 | Hartog | E21B 47/06 |
| | | | 166/250.01 |
| 2013/0278422 A1* | 10/2013 | Friedman | G08B 25/008 |
| | | | 340/541 |
| 2016/0234232 A1 | 8/2016 | Poder et al. | |
| 2016/0308859 A1 | 10/2016 | Barry et al. | |
| 2017/0213447 A1 | 7/2017 | Horrocks et al. | |
| 2017/0372602 A1* | 12/2017 | Gilliland | G01S 17/86 |
| 2018/0322660 A1* | 11/2018 | Smith | G06T 7/97 |
| 2019/0236920 A1* | 8/2019 | Huang | G08B 31/00 |
| 2020/0191613 A1 | 6/2020 | Englund | |
| 2022/0172479 A1* | 6/2022 | Yoda | G08B 13/22 |

FOREIGN PATENT DOCUMENTS

| | | |
|---|---|---|
| CN | 1922600 A | 2/2007 |
| CN | 101496074 A | 7/2009 |
| CN | 105787440 A | 7/2016 |
| DE | 3731773 C1 | 5/1989 |
| JP | S54-134500 A | 10/1979 |
| JP | 2007-304955 A | 11/2007 |
| JP | 2009-128984 A | 6/2009 |
| JP | 2013-167986 A | 8/2013 |
| JP | 2014-514791 A | 6/2014 |
| JP | 2017-134681 A | 8/2017 |
| WO | 2018/085893 A1 | 5/2018 |

OTHER PUBLICATIONS

International Search Report for PCT Application No. PCT/JP2020/000889, mailed on Mar. 3, 2020.
CN Office Action for CN Application No. 202080024551.5. mailed on Oct. 24, 2022 with English Translation.
US Office Action for U.S. Appl. No. 16/229,574, mailed on Oct. 8, 2019.
Abellan et al., "Rockfall Monitoring by Terrestrial Laser Scanning—Case Study of the Basaltic Rock Face at Castellfollit de la Roca (Catalonia, Spain)", Nat. Hazards Earth Syst Sci., Mar. 15, 2011.
Andersson et al., "Smoke Detection in Buildings with High Ceilings", SP Swedish National Testing and Research Institute, Brandforsk Project No. 628-011, 2003.
Evarts, "Structure Fires in Warehouses", National Fire Protection Association, (Fire Analysis and Research Division National Fire Protection Association), Sep. 2011.
Fraser-Mitchel et al. "Sprinkler Installation Trends and Fire Statistics for Warehouse Buildings", Building Research Establishment Ltd., DCLG Final Research Report BD 2537 (D2V1) 226839, Mar. 24, 2006.
Grosshandler, "A Review of Measurements and Candidate Signatures for Early Fire Detection", Building and Fire Research Laboratory, National Institute of Standards and Technology, Jan. 1995.
Kemeny et al., "Digital Imaging for Rock Mass Characterization", Dept. Mining and Geological Engineering, University of Arizona, Nov. 2016.
McHugh et al,, "Simplified Hyperspectral Imaging for Improved Geologic Mapping of Mine Slopes", National Institute for Occupational Safety and Health, Carnegie Mellon Research Institute, in Proceedings of the Third International Conference on Intelligent Processing and Manufacturing of Materials, Aug. 2011.
Partsinevelos et al., "Integration of Seismic and Image Data Processing for Rockfall Monitoring and Early Warning Along Transportation Networks", Springer, Nat. Hazards, Jul. 18, 2016.
Peacock et al., "An Analysis of Security Issues in Building Automation Systems", Proceedings of the 12th Australian Information Security Management Conference, Dec. 2014.
Schneider Electric, T A.C., "Integration: The Future of Commercial Office Building Security", White Paper, 2006.
Vorster et al., "Using Radar Technology to Assess the Effect of Dewatering on Slope Stability", The Southern African institute of Mining and Metallurgy, Slope Stability 2015, Oct. 2015.

* cited by examiner

| NAME | MOVEMENT PATH | STEP LENGTH | WALKING PACE | ... |
|------|---------------|-------------|--------------|-----|
| abc | ○○<br>→○△<br>→ ... | x cm | y km/h | ... |
| ... | ... | ... | ... | ... |

Fig. 3

| VIBRATION DATA | PATTERN OF ACTION |
|---|---|
| A | P1 |
| B | P2 |
| C | P3 |

Fig. 10

MONITORING SYSTEM, MONITORING DEVICE, MONITORING METHOD, AND NON-TRANSITORY COMPUTER-READABLE MEDIUM

This application is a National Stage Entry of PCT/JP2020/000889 filed on Jan. 14, 2020, which claims priority from Japanese Patent Application 2019-068645 filed on Mar. 29, 2019, the contents of all of which are incorporated herein by reference, in their entirety.

TECHNICAL FIELD

The present disclosure relates to monitoring systems, monitoring devices, monitoring methods, and non-transitory computer-readable media.

BACKGROUND ART

Conventionally, in high-security facilities, people are authenticated through biometric authentication (face recognition, iris recognition, or the like), card key-based identification (ID) authentication, or the like at entrance gates to the facilities. This makes it possible to keep a record of who has passed through a gate and when based on information obtained from people authentication but does not allow for monitoring the actions that people engage in after passing through the gate.

In addition, on expressways or the like, vehicles are authenticated through camera authentication performed by use of cameras, electronic toll collection system (ETC) card-based ID authentication, or the like at entrance and exit gates. This makes it possible to keep a record of whose/which vehicle has passed through a gate and when based on information obtained from vehicle authentication but does not allow for monitoring the actions that vehicles engage in after passing through the gate.

Meanwhile, some technologies have been proposed recently where actions of people and vehicles are monitored by use of optical fibers.

For example, according to the technique described in Patent Literature 1, a sensor carpet provided with an optical fiber is laid, for example, on the floor in a room. The optical fiber detects, at a plurality of points, distortion produced as a person presses the optical fiber, and an analyzing device identifies an action of the person by analyzing a change of signals observed at the plurality of points.

CITATION LIST

Patent Literature

Patent Literature 1: Japanese Unexamined Patent Application Publication No. 2009-128984

SUMMARY OF INVENTION

Technical Problem

The technique described in Patent Literature 1, however, identifies an action of a person based on the rough size and duration of distortion observed at a specific point. Therefore, the technique has shortcomings in that it can detect a person only at a very limited position. In addition, for example, the technique has shortcomings in that the accuracy cannot be ensured when actions of persons of similar weight are to be identified. Moreover, the technique has shortcomings in that it cannot identify a detailed pattern of action of a person.

Accordingly, the present disclosure is directed to addressing the above-described shortcomings and to providing a monitoring system, a monitoring device, a monitoring method, and a non-transitory computer-readable medium that are capable of identifying a pattern of action of a person or a vehicle with higher accuracy and with details.

Solution to Problem

A monitoring system according to one aspect includes:
an optical fiber laid in a monitoring area;
an authenticating unit configured to authenticate a person or a vehicle passing through a gate for entering the monitoring area;
an optical fiber sensing unit configured to acquire, based on an optical signal received from the optical fiber, a parameter having a unique pattern corresponding to a pattern of action of the authenticated person or vehicle; and
an analyzing unit configured to identify the pattern of action of the authenticated person or vehicle based on the unique pattern of the parameter.

A monitoring device according to one aspect includes:
an optical fiber sensing unit configured to acquire, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and
an analyzing unit configured to identify the pattern of action of the authenticated person or vehicle based on the unique pattern of the parameter.

A monitoring method according to one aspect includes:
a step of acquiring, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and
a step of identifying the pattern of action of the authenticated person or vehicle based on the unique pattern of the parameter.

A non-transitory computer-readable medium according to one aspect is
a non-transitory computer-readable medium storing a program that causes a computer to execute:
a procedure of acquiring, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and
a procedure of identifying the pattern of action of the authenticated person or vehicle based on the unique pattern of the parameter.

Advantageous Effects of Invention

The above aspects can advantageously provide a monitoring system, a monitoring device, a monitoring method, and a non-transitory computer-readable medium that are capable of identifying a pattern of action of a person or a vehicle with higher accuracy and with details.

BRIEF DESCRIPTION OF DRAWINGS

FIG. 3 illustrates an example of a pattern of action recorded in a database with the pattern of action associated with authentication information by an analyzing unit according to the example embodiment.

FIG. 10 illustrates an example of training data to be used in the machine learning to be executed by the analyzing unit according to the example embodiment.

DESCRIPTION OF EMBODIMENTS

Hereinafter, an example embodiment of the present disclosure will be described with reference to the drawings.

Example Embodiment

Configuration of Example Embodiment

Figure 1:
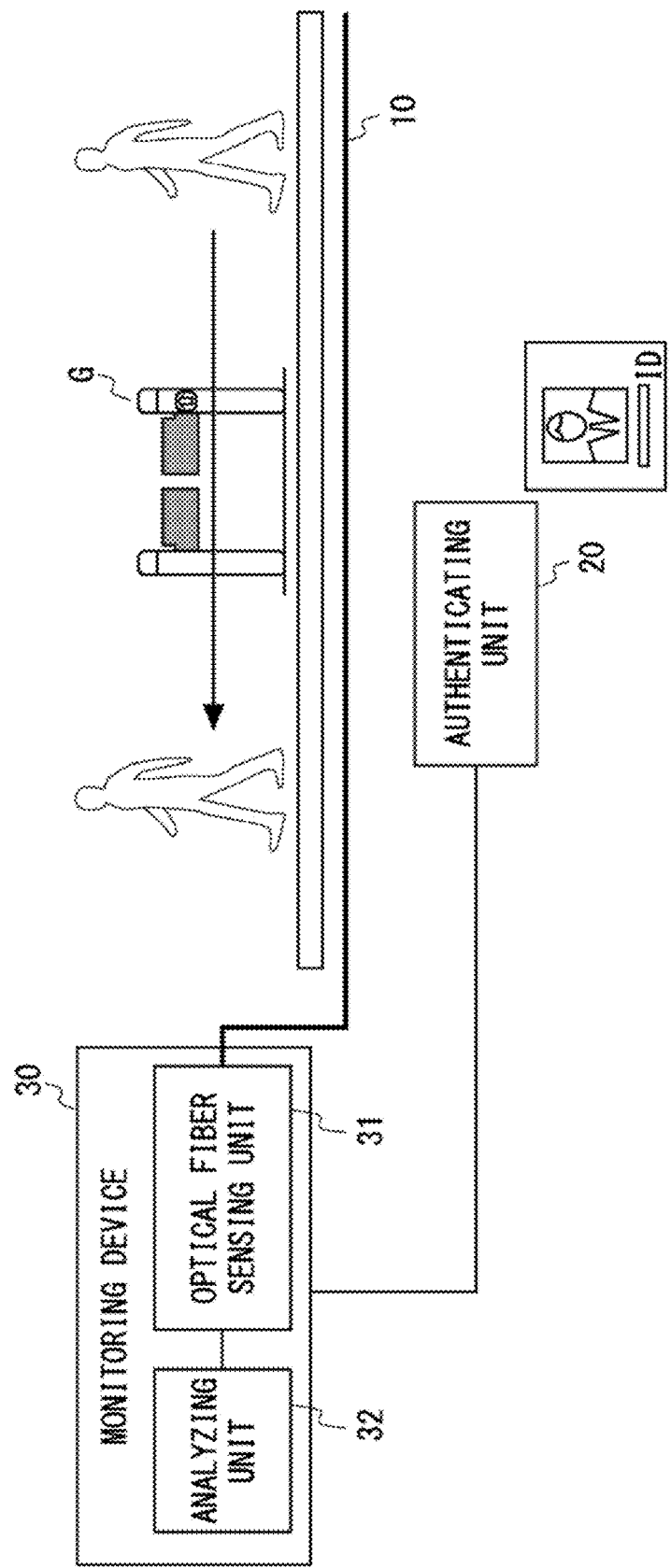
FIG. 1 illustrates an example of a configuration of a monitoring system according to an example embodiment.

First, with reference to FIGS. 1 and 2, some configurations of a monitoring system according to an example embodiment will be described. FIG. 1 illustrates a monitoring system whose target to monitor is a person, and FIG. 2 illustrates a monitoring system whose target to monitor is a vehicle.

Figure 2:
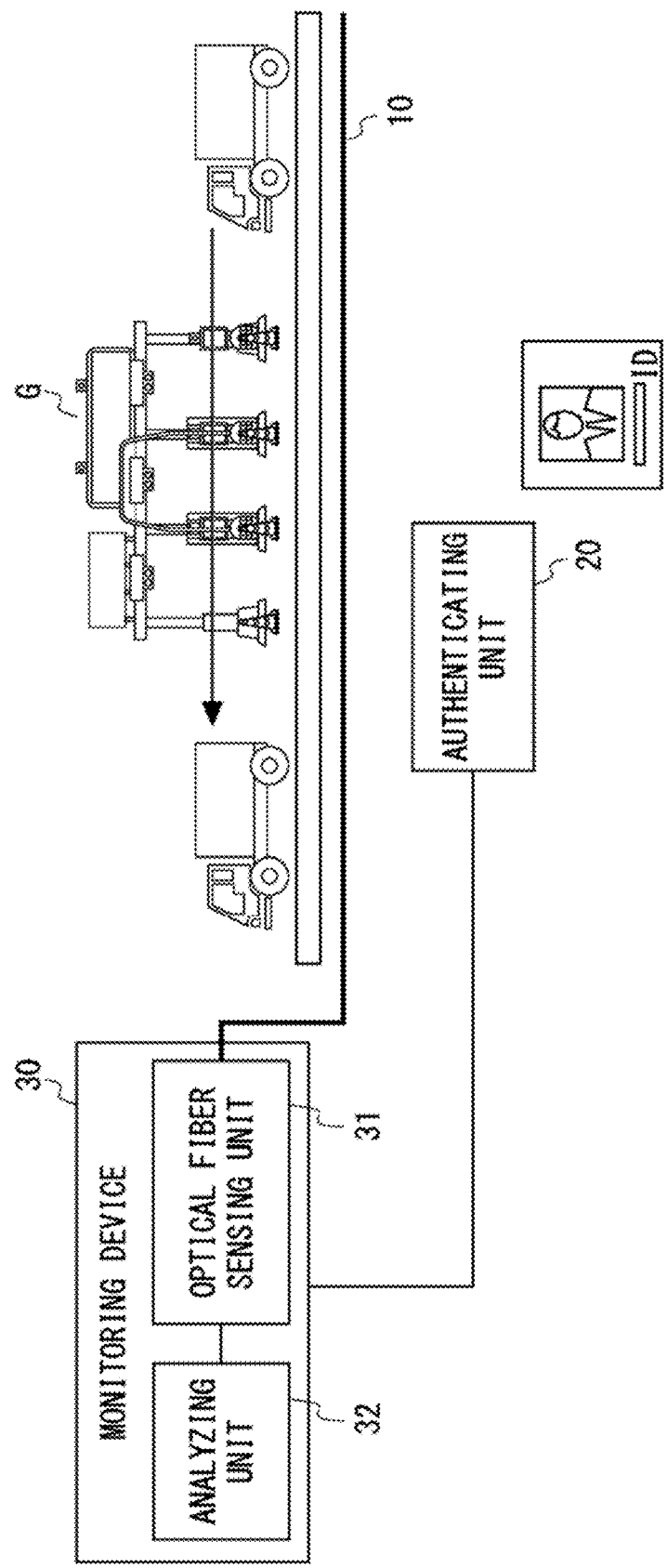
FIG. 2 illustrates another example of a configuration of the monitoring system according to the example embodiment.

As illustrated in FIGS. 1 and 2, the monitoring system according to the present example embodiment includes an optical fiber 10, an authenticating unit 20, and a monitoring device 30.

The optical fiber 10 is laid in a monitoring area where actions of people or vehicles are to be monitored. A monitoring area is an area that a person or a vehicle can enter only by passing through a gate G for entering the monitoring area. In a case where a target to be monitored is a person, a monitoring area is a facility such as a commercial establishment, an office, a hospital, an airport, a nursing home, or a day care center, for example. In a case where a target to be monitored is a vehicle, a monitoring area is, for example but not limited to, an expressway or a parking lot. In a case where a monitoring area is an indoor area, the optical fiber 10 is laid under the floor or the like, for example. In a case where a monitoring area is an outdoor area, the optical fiber 10 is laid in the ground or the like, for example. The optical fiber 10 may be laid in a monitoring area in the form of an optical fiber cable formed by covering the optical fiber 10.

The authenticating unit 20 authenticates a person or a vehicle that has passed through the gate G and acquires authentication information indicating the authenticated person or vehicle. A person is authenticated, for example but not limited to, through image authentication, through ID authentication based on a card key, an integrated circuit (IC) tag, a QR code (registered trademark), or the like, or through biometric authentication based on the person's face, fingerprint, iris, vein, or the like. Authentication information to be acquired upon a person being authenticated is, for example but not limited to, the person's image, name, or ID. Meanwhile, a vehicle is authenticated through, for example but not limited to, image authentication performed by a camera or ID authentication based on an ETC card or the like. Authentication information to be acquired upon a vehicle being authenticated is, for example but not limited to, an image of the vehicle, its vehicle type, the name of the owner, or the vehicle's ID.

Upon authenticating a person or a vehicle that has passed through the gate G, the authenticating unit 20 transmits, to the monitoring device 30, authentication information acquired at the time of the authentication, time information indicating the time of the authentication, and the like along with a notification indicating that the authentication has been performed.

The monitoring device 30 tracks actions that a person or a vehicle engages in after passing through the gate G, triggered upon receiving a notification from the authenticating unit 20 indicating that the person or the vehicle that has passed through the gate G has been authenticated. The monitoring device 30 includes an optical fiber sensing unit 31 and an analyzing unit 32. In this example, the optical fiber sensing unit 31 and the analyzing unit 32 may be provided in separate devices and configured to be capable of communicating with each other.

The optical fiber sensing unit 31 is connected to the optical fiber 10 and inputs pulsed light to the optical fiber 10. Moreover, the optical fiber sensing unit 31 receives, from the optical fiber 10, back-reflection light that arises at each transmission distance as pulsed light is transmitted through the optical fiber 10.

In this example, when a person or a vehicle that has passed through the gate G moves in a monitoring area, vibrations are produced as the person or the vehicle comes into contact with the ground or the floor. Such vibrations are transmitted to the optical fiber 10 laid in the monitoring area and superposed onto back-reflection light transmitted through the optical fiber 10. Accordingly, the optical fiber sensing unit 31 can detect the vibrations produced through the movement of the person or the vehicle based on the backscattering light received from the optical fiber 10. Moreover, the optical fiber sensing unit 31 can further detect the position where the received backscattering light has been generated (the distance from the optical fiber sensing unit 31) based on the time passing from when the optical fiber sensing unit 31 has input pulsed light to the optical fiber 10 to when the optical fiber sensing unit 31 has received the backscattering light superposed with the vibrations.

For example, the optical fiber sensing unit 31 detects backscattering light received from the optical fiber 10 by use of a distributed vibration sensor. Thus, the optical fiber sensing unit 31 can detect vibrations produced through a movement of a person or a vehicle as well as the position where the backscattering light superposed with these vibrations has been generated and can thus acquire vibration data of the detected vibrations.

In this example, a vibration pattern of vibrations detected by the optical fiber sensing unit 31 is a fluctuation pattern that fluctuates dynamically. Meanwhile, for those people who have passed through the gate G, for example, their patterns of actions after passing through the gate G differ from one another. Examples of a pattern of action of a person include the person's movement path or the person's gait. Examples of a person's gait include the person's step length, walking pace, foot stepping force, or manner of walking (e.g., how the pressure is exerted onto the sole when the person lands his or her foot). Therefore, vibration data of vibrations detected by the optical fiber sensing unit 31 has a dynamic, unique pattern where the fluctuations of the intensity of the vibrations, the position of the vibrations, the number of the vibrations, for example, change differently depending on the pattern of action that each person engages in after passing through the gate G.

Therefore, the analyzing unit 32 analyzes the dynamic change of a unique pattern of vibration data acquired by the optical fiber sensing unit 31 and can thus identify a pattern of action that a person engages in after passing through the gate G. For example, the analyzing unit 32 can identify the position where a person is located after passing through the gate G by analyzing the dynamic change of the unique pattern of vibrations produced near the gate G at the time when the analyzing unit 32 receives the above-described notification from the authenticating unit 20 and can also identify the movement path of that person by analyzing the change in the position of that person. Moreover, the analyzing unit 32 can identify the gait with which a person walks (e.g., the step length, the walking pace, the foot stepping force, the manner of walking, or the like) after passing through the gate G by analyzing the dynamic change in the unique pattern.

Meanwhile, for those vehicles that have passed through the gate G, for example, their patterns of actions after passing through the gate G differ from one another. Examples of a pattern of action of a vehicle include a movement path of the vehicle. Therefore, vibration data of vibrations detected by the optical fiber sensing unit 31 has a dynamic, unique pattern where the fluctuations of the intensity of the vibrations, the position of the vibrations, the number of the vibrations, for example, change differently depending on the pattern of action of a vehicle that moves in a monitoring area.

Therefore, the analyzing unit 32 analyzes the dynamic change of a unique pattern of vibration data acquired by the optical fiber sensing unit 31 and can thus identify a pattern of action that a vehicle engages in after passing through the gate G. A method of identifying a movement path as a pattern of action of a vehicle is similar to the method of identifying the movement path of a person described above.

In this example, when a person or a vehicle that has passed through the gate G moves in a monitoring area, a sound and a change in the temperature are produced as the person or the vehicle comes into contact with the ground or the floor. Such a sound and a temperature held after the change are also superposed onto the back-reflection light transmitted by the optical fiber 10 laid in a monitoring area. Accordingly, the optical fiber sensing unit 31 can also detect the sound and the temperature produced through the movement of the person or the vehicle based on the backscattering light received from the optical fiber 10.

For example, the optical fiber sensing unit 31 can detect a sound and a temperature produced through a movement of a person or a vehicle by detecting the backscattering light received from the optical fiber 10 by use of, respectively, a distributed acoustic sensor and a distributed temperature sensor and acquire acoustic data of the detected sound and temperature data of the detected temperature.

In this example, the sound and the temperature detected by the optical fiber sensing unit 31 also differ depending on the pattern of action that a person or a vehicle engages in after passing through the gate G. Therefore, the acoustic data of a sound and the temperature data of a temperature detected by the optical fiber sensing unit 31 each also have a dynamic unique pattern corresponding to the pattern of action that the person or the vehicle engages in after passing through the gate G.

Therefore, according to the present example embodiment, the analyzing unit 32 identifies a pattern of action that a person or a vehicle engages in after passing through the gate G based on the unique pattern of a parameter, such as vibrations, a sound, or a temperature, corresponding to the pattern of action that the person or the vehicle engages in after passing through the gate G.

In this example, the analyzing unit 32 may record, into a database, an identified pattern of action that a person or a vehicle engages in after passing through the gate G with the identified pattern of action associated with authentication information transmitted along with the above-described notification from the authenticating unit 20. The database may be held in the analyzing unit 32 or in a separate constituent element internal or external to the monitoring device 30. FIG. 3 illustrates an example of some patterns of actions recorded in a database with the patterns of actions associated with authentication information. FIG. 3 illustrates an example in which identified patterns of actions that a person engages in after passing through the gate G are recorded with the identified patterns of actions associated with the person's authentication information (the name, in this example). Moreover, the analyzing unit 32 may perform machine learning (e.g., deep learning or the like) of patterns of actions of a person recorded in a database and update or add a pattern of action recorded in the database, as needed.

In response to the authenticating unit 20 authenticating a person or a vehicle that has passed through the gate G, the analyzing unit 32 may extract a pattern of action associated with the authentication information of the person or the vehicle that has passed through the gate G from a database and sound an alarm if a subsequent pattern of action of the person or the vehicle that has passed through the gate G fails to match the pattern of action extracted from the database.

In response to the authenticating unit 20 authenticating a person or a vehicle that has passed through the gate G, the analyzing unit 32 may extract a pattern of action associated with the authentication information of the person or the vehicle that has passed through the gate G from a database, identify the destination to which the person or the vehicle should move based on the pattern of action extracted from the database, and notify the person or the vehicle of the identified destination. For example, in a case where the target to be monitored is a person, conceivable destinations include a conference room. With respect to conceivable notification methods of notifying a person of the destination being a conference room or the like, the path on the floor leading to the destination may be illuminated, the destination may be displayed on an electric light display, the destination may be announced by voice, or an indicator in front of the destination may be lit or flashed, for example. In a case where the target to be monitored is a person, conceivable destinations include a parking space in a parking lot.

In response to the authenticating unit 20 authenticating a person or a vehicle that has passed through the gate G, the analyzing unit 32 may sound an alarm if a pattern of action associated with the authentication information of the person or the vehicle that has passed through the gate G is not recorded in a database. If the target to be monitored is a person, aside from sounding an alarm, the analyzing unit 32 may notify a guardhouse or regulate the access to the monitoring area by locking the gate G.

Next, some methods with which the analyzing unit 32 identifies a pattern of action that a person or a vehicle engages in after passing through the gate G will be described in detail. The analyzing unit 32 may identify a pattern of action that a person or a vehicle engages in after passing through the gate G by use of any of the following methods A1 to A8.

(1) Method A1

Figure 4:
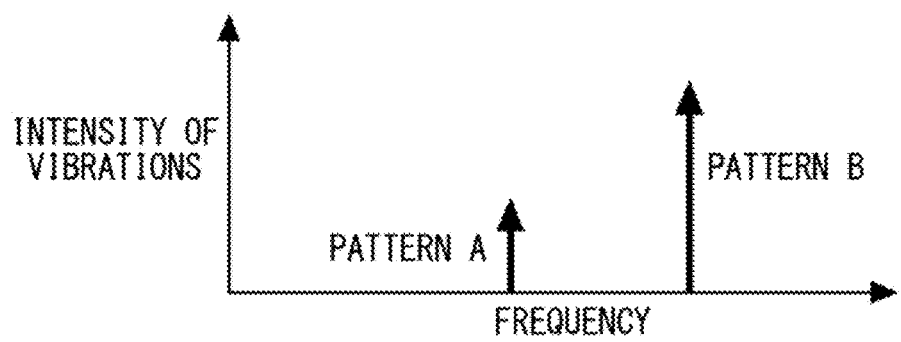
FIG. 4 illustrates an example of vibration data to be acquired by an optical fiber sensing unit according to the example embodiment.

First, the method A1 will be described with reference to FIG. 4. FIG. 4 illustrates vibration data (the horizontal axis represents the frequency, and the vertical axis represents the intensity of vibrations) obtained by performing fast Fourier transform (FFT) on vibration data (the horizontal axis represents the time, and the vertical axis represents the intensity of vibrations) of vibrations produced as a person comes into contact with the ground or the floor in a monitoring area.

In the vibration data illustrated in FIG. 4, a frequency peak of the intensity of the vibrations arises. The frequency at which this frequency peak arises differs depending on each person's gait (e.g., the foot stepping force, the manner of walking, and so on).

Therefore, when the analyzing unit 32 is to identify a pattern of action that a person engages in after passing through the gate G, the analyzing unit 32 acquires, from the optical fiber sensing unit 31, the vibration data (e.g., vibration data similar to the vibration data illustrated in FIG. 4) monitoring vibrations produced in the monitoring area after the person has passed through the gate G. Then, the analyzing unit 32 determines the gait of that person based on the frequency at which a frequency peak arises in the acquired vibration data.

(2) Method A2

Figure 5:
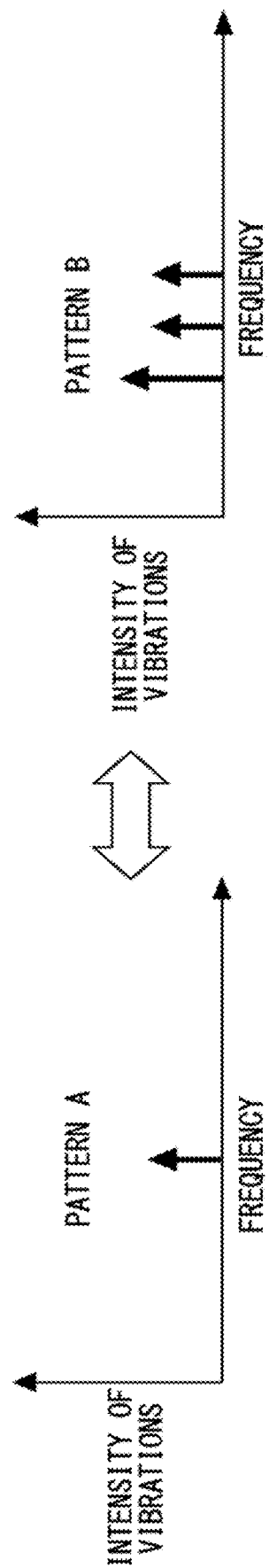
FIG. 5 illustrates another example of vibration data to be acquired by the optical fiber sensing unit according to the example embodiment.

Next, the method A2 will be described with reference to FIG. 5. FIG. 5 illustrates vibration data (the horizontal axis represents the frequency, and the vertical axis represents the intensity of vibrations) obtained by performing FFT on vibration data (the horizontal axis represents the time, and the vertical axis represents the intensity of vibrations) of vibrations produced as a person comes into contact with the ground or the floor in a monitoring area.

In the vibration data illustrated in FIG. 5, a frequency peak of the intensity of the vibrations arises. The frequency at which this frequency peak arises and the number of frequency peaks differ depending on each person's gait (e.g., the foot stepping force, the manner of walking, and so on).

Therefore, when the analyzing unit 32 is to identify a pattern of action that a person engages in after passing through the gate G, the analyzing unit 32 acquires, from the optical fiber sensing unit 31, the vibration data (e.g., vibration data similar to the vibration data illustrated in FIG. 5) monitoring vibrations produced in the monitoring area after the person has passed through the gate G. Then, the analyzing unit 32 determines the gait of that person based on the frequency at which a frequency peak arises and the number of frequency peaks in the acquired vibration data.

(3) Method A3

Figure 6:
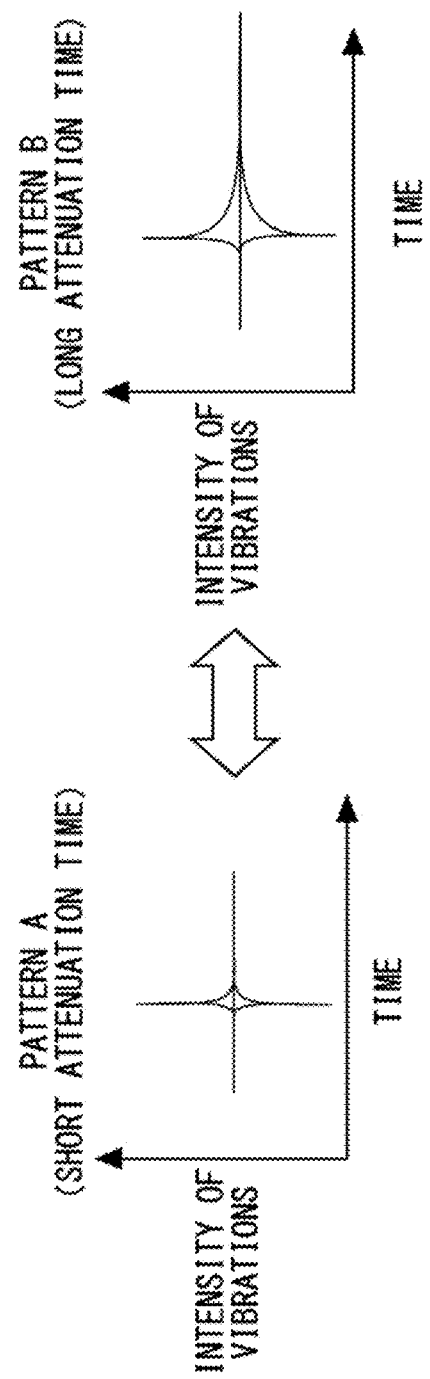
FIG. 6 illustrates another example of vibration data to be acquired by the optical fiber sensing unit according to the example embodiment.

Next, the method A3 will be described with reference to FIG. 6. FIG. 6 illustrates vibration data (the horizontal axis represents the time, and the vertical axis represents the intensity of vibrations) of vibrations produced as a person comes into contact with the ground or the floor in a monitoring area.

In the vibration data illustrated in FIG. 6, the vibrations produced in the monitoring area are attenuated afterward. This attenuation time differs depending on each person's gait (e.g., the foot stepping force, the manner of walking, and so on).

Therefore, when the analyzing unit 32 is to identify a pattern of action that a person engages in after passing through the gate G, the analyzing unit 32 acquires, from the optical fiber sensing unit 31, the vibration data (e.g., vibration data similar to the vibration data illustrated in FIG. 6) monitoring vibrations produced in the monitoring area after the person has passed through the gate G. Then, the analyzing unit 32 determines the gait of that person based on the attenuation time in the acquired vibration data.

(4) Method A4

Figure 7:
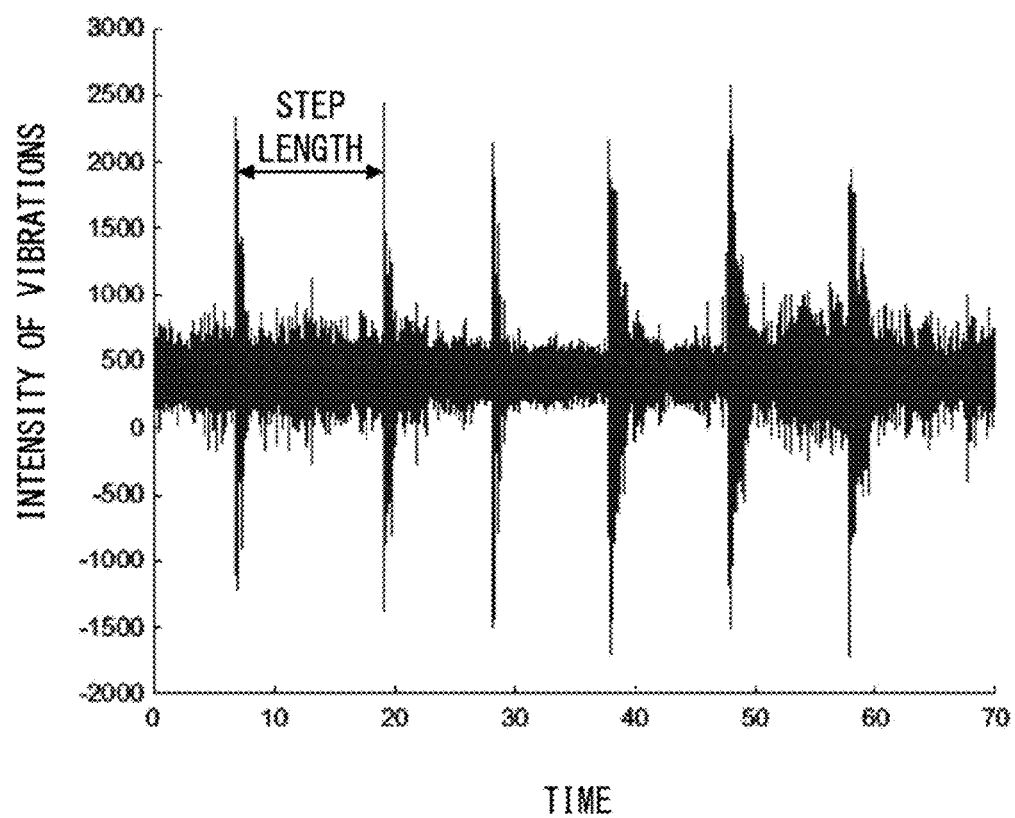
FIG. 7 illustrates another example of vibration data to be acquired by the optical fiber sensing unit according to the example embodiment.

Next, the method A4 will be described with reference to FIG. 7. FIG. 7 illustrates vibration data (the horizontal axis represents the time, and the vertical axis represents the intensity of vibrations) of vibrations produced as a person comes into contact with the ground or the floor in a monitoring area.

In the vibration data illustrated in FIG. 7, the vibrations occur at intervals. These intervals of the vibrations differ depending on each person's step length.

Therefore, when the analyzing unit 32 is to identify a pattern of action that a person engages in after passing through the gate G, the analyzing unit 32 acquires, from the optical fiber sensing unit 31, the vibration data (e.g., vibration data similar to the vibration data illustrated in FIG. 7) monitoring vibrations produced in the monitoring area after the person has passed through the gate G. Then, the analyzing unit 32 determines the step length of that person based on the intervals of the vibrations in the acquired vibration data.

(5) Method A5

Figure 8:
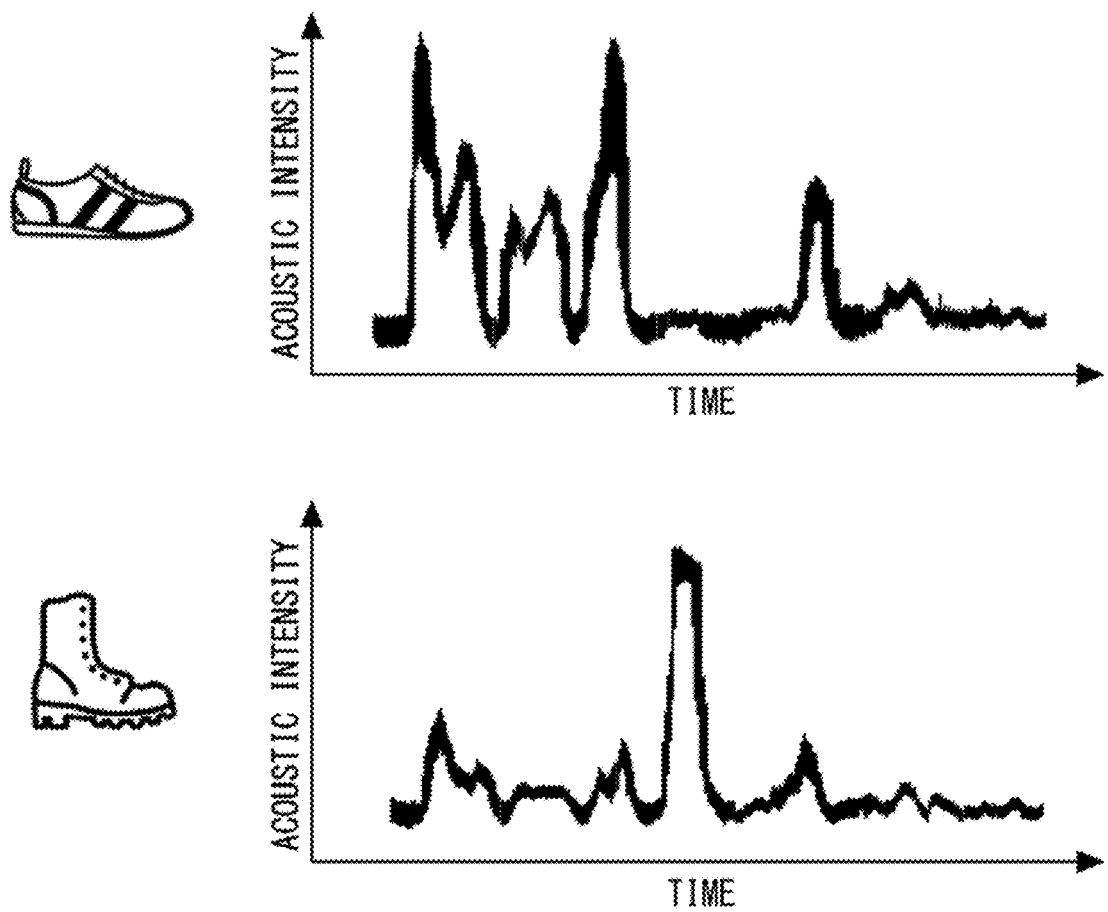
FIG. 8 illustrates an example of acoustic data to be acquired by the optical fiber sensing unit according to the example embodiment.

Next, the method A5 will be described with reference to FIG. 8. FIG. 8 illustrates acoustic data (the horizontal axis represents the time, and the vertical axis represents the acoustic intensity) of a sound produced as a person comes into contact with the ground or the floor in a monitoring area.

In the acoustic data illustrated in FIG. 8, the waveform varies depending on each person's gait. The acoustic data illustrated in FIG. 8 is an example in which the waveform varies by the shoe types.

Therefore, when the analyzing unit 32 is to identify a pattern of action that a person engages in after passing through the gate G, the analyzing unit 32 acquires, from the optical fiber sensing unit 31, the acoustic data (e.g., acoustic data similar to the acoustic data illustrated in FIG. 8) monitoring a sound produced in the monitoring area after the person has passed through the gate G. Then, the analyzing unit 32 determines the gait of that person based on the waveform of the acquired acoustic data.

(6) Method A6

Next, the method A6 will be described.

The method A6 identifies a pattern of action that a person or a vehicle engages in after passing through the gate G by use of pattern matching.

When the analyzing unit 32 is to identify a pattern of action that a person or a vehicle engages in after passing through the gate G, the analyzing unit 32 acquires, from the optical fiber sensing unit 31, a parameter (e.g., vibration data or acoustic data similar to the vibration data or the acoustic data illustrated in any of FIGS. 4 to 8) of vibrations, a sound, a temperature, or the like produced in the monitoring area after the person or the vehicle has passed through the gate G. The analyzing unit 32 then compares the unique pattern of the acquired parameter against a preset pattern for matching and identifies a pattern of action of the person or the vehicle if the unique pattern matches the pattern for matching. In this example, for patterns of actions of a person, the analyzing unit 32 may hold a pattern for matching for identifying the movement path and a pattern for matching for identifying the gait separately. Moreover, the analyzing unit 32 may hold a pattern for matching for each factor (e.g., the step length, the walking pace, the foot stepping force, the manner of walking, and so on) that determines the gait.

In this case, the analyzing unit 32 may calculate the rate of match of the unique pattern against a pattern for matching and compare the calculated rate of match against a threshold. Thus, the analyzing unit 32 may determine whether the unique pattern matches the pattern for matching. For example, in the example shown in Table 1, the analyzing unit 32 determines that it is a match if the rate of match is 70% or higher, determines that it is not a match if the rate of match is 40% or lower, or determines that there is a possibility of a match if the rate of match is between 40% and 70%.

TABLE 1

| Rate of Match | Match/Not Match |
| --- | --- |
| 70% or higher | Match |
| 40% to 70% | Possibility of Match |
| 40% or lower | Not Match |

Moreover, the analyzing unit 32 may learn a pattern for matching through machine learning (e.g., deep learning or the like). Furthermore, the analyzing unit 32 may update or add a pattern for matching, as needed, through machine learning.

(7) Method A7

Next, the method A7 will be described.

The method A7 involves machine learning (e.g., deep learning or the like) of, as a unique pattern of a parameter of vibrations, a sound, a temperature, or the like produced in a monitoring area, unique patterns corresponding to patterns of actions of persons or vehicles and identifies a pattern of action of a person or a vehicle by use of the learning result (initial training model) of the machine learning. In this example, for patterns of actions of a person, the analyzing unit 32 may hold an initial training model for identifying the movement path and an initial training model for identifying the gait separately. Moreover, the analyzing unit 32 may hold an initial training model for each factor (e.g., the step length, the walking pace, the foot stepping force, the manner of walking, and so on) that determines the gait.

Now, with reference to FIG. 9, a method of machine learning in the method A7 will be described. In this example, the analyzing unit 32 undergoes machine learning of unique patterns of vibration data corresponding to patterns of actions of a person.

Figure 9:
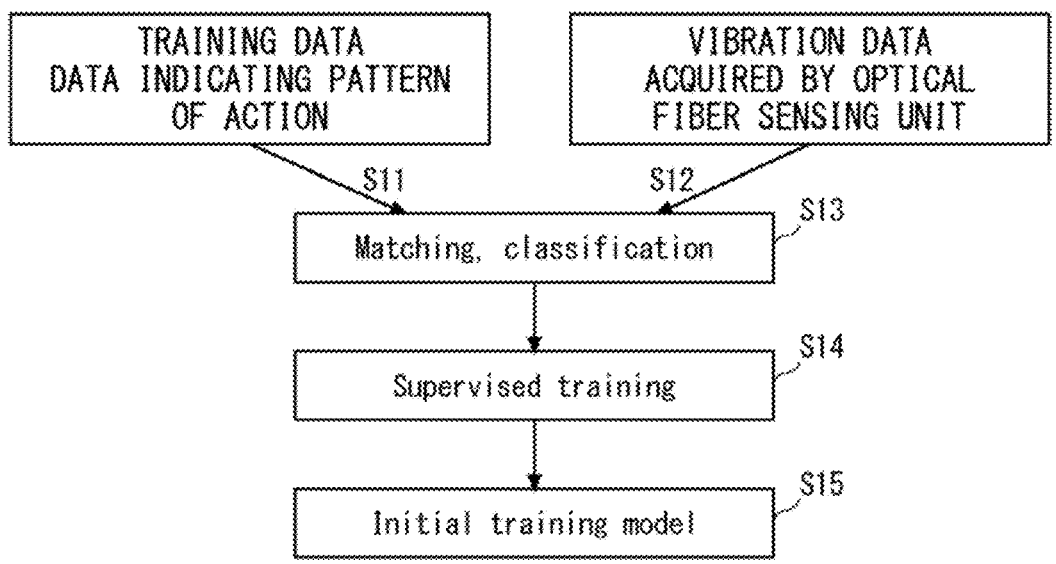
FIG. 9 is a flowchart illustrating an example of machine learning to be executed by the analyzing unit according to the example embodiment.

As illustrated in FIG. 9, the analyzing unit 32 receives input of training data indicating a pattern of action of a person and vibration data representing vibrations produced in the monitoring area when the person has engaged in that pattern of action and acquired by the optical fiber sensing unit 31 (steps S11 and S12). FIG. 10 illustrates an example of the training data. FIG. 10 illustrates an example of the training data for training a model on three pieces of vibration data A, B, and C. Each vibration data, for example, takes the form similar to the vibration data illustrated in any of FIGS. 4 to 7.

Next, the analyzing unit 32 performs matching and classification of the training data and the vibration data (step S13) and undergoes supervised training (step S14). This produces an initial training model (step S15). This initial training model serves as a model that, in response to an input of monitored vibration data, outputs a pattern of action of a person or a vehicle.

When the analyzing unit 32 is to identify a pattern of action that a person or a vehicle engages in after passing through the gate G, the analyzing unit 32 acquires, from the optical fiber sensing unit 31, the vibration data (e.g., vibration data similar to the vibration data illustrated in any of FIGS. 4 to 7) monitoring vibrations produced in the monitoring area after the person or the vehicle has passed through the gate G and inputs the acquired vibration data to the initial training model. Thus, the analyzing unit 32 obtains, from the result output by the initial training model, the pattern of action of the person or the vehicle.

(8) Method A8

Next, the method A8 will be described with reference to FIG. 11. In this example, the movement path of a person is identified. The lower part of FIG. 11 illustrates vibration data (the horizontal axis represents the position (the distance from the optical fiber sensing unit 31), and the vertical axis represents the elapsed time) of vibrations produced as a person comes into contact with the ground or the floor in a monitoring area.

Figure 11:
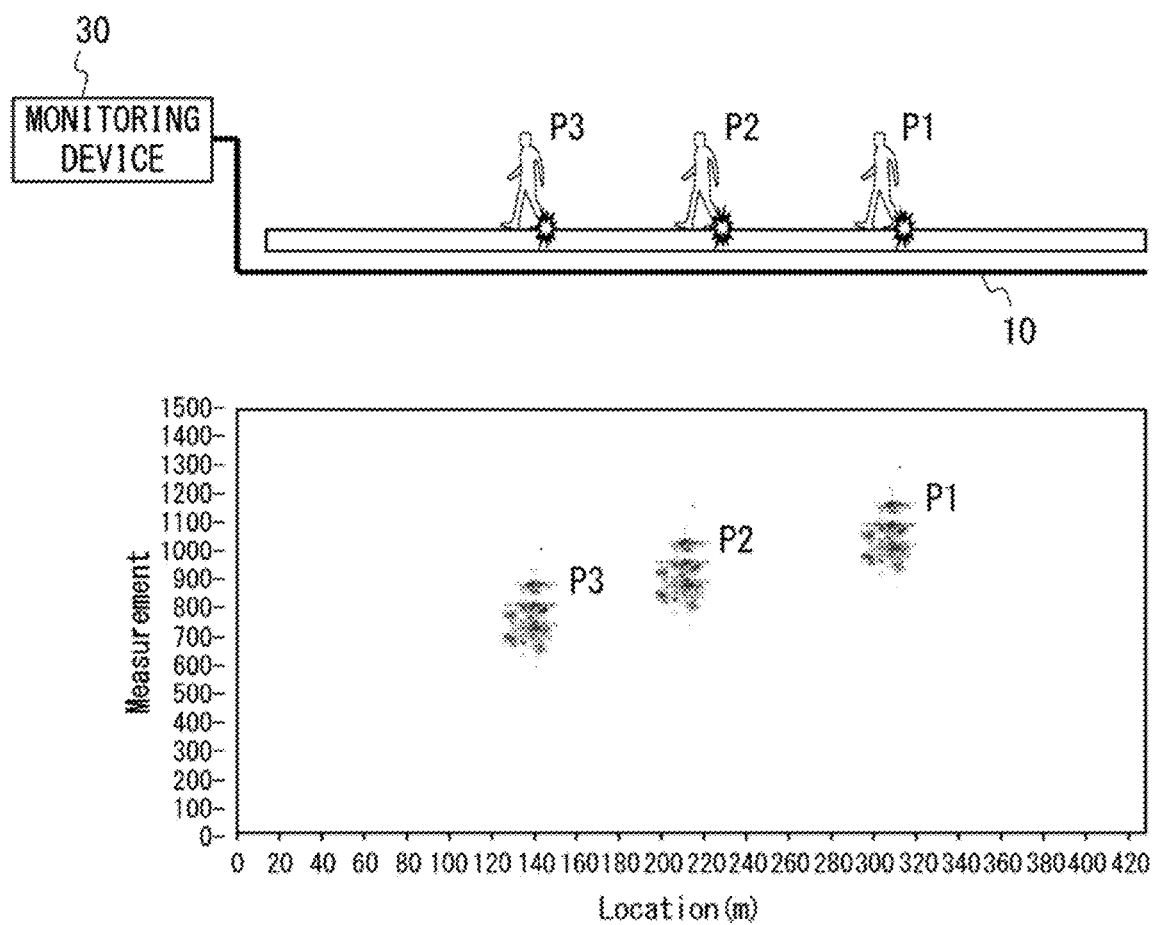
FIG. 11 illustrates an example of a method with which the analyzing unit identifies a movement path of a person, according to the example embodiment.

In the example illustrated in FIG. 11, a unique pattern is generated by vibrations produced as a person comes into contact with the ground or the floor at a plurality of points (P1 to P3). Therefore, tracking the positions where each unique pattern is generated makes it possible to identify the movement path that the person takes after passing through the gate G.

Therefore, when the analyzing unit 32 is to identify a pattern of action that a person engages in after passing through the gate G, the analyzing unit 32 acquires, from the optical fiber sensing unit 31, the vibration data (e.g., vibration data similar to the vibration data illustrated in FIG. 11) monitoring vibrations produced in the monitoring area after the person has passed through the gate G. Then, the analyzing unit 32 identifies the position of each of the plurality of points (P1 to P3) where the unique patterns are generated in the acquired vibration data and identifies the movement path of that person based on the position change of the identified positions.

The method of identifying the path is not limited to the above.

For example, the analyzing unit 32 may identify the movement path by compositely matching and analyzing the unique patterns detected at the plurality of points (P1 to P3). The composite matching and analysis includes a process of regarding the plurality of points (P1 to P3) as a single pattern and performing matching against a pattern for matching (e.g., a pattern representing a walk of a person), for example.

Moreover, the analyzing unit 32 may identify a unique pattern of a person being tracked by analyzing vibrations observed at each point and track that person while continuing to identify that person. In this case, for example, the analyzing unit 32 may identify that P1 to P3 are unique patterns belonging to the same person upon performing pattern matching so as to detect the unique pattern of the person identified at P1 and P2 also at P3 and identify the movement path of that person.

Next, with reference to FIG. 12, a hardware configuration of a computer 40 that implements the monitoring device 30 according to the present example embodiment will be described.

Figure 12:
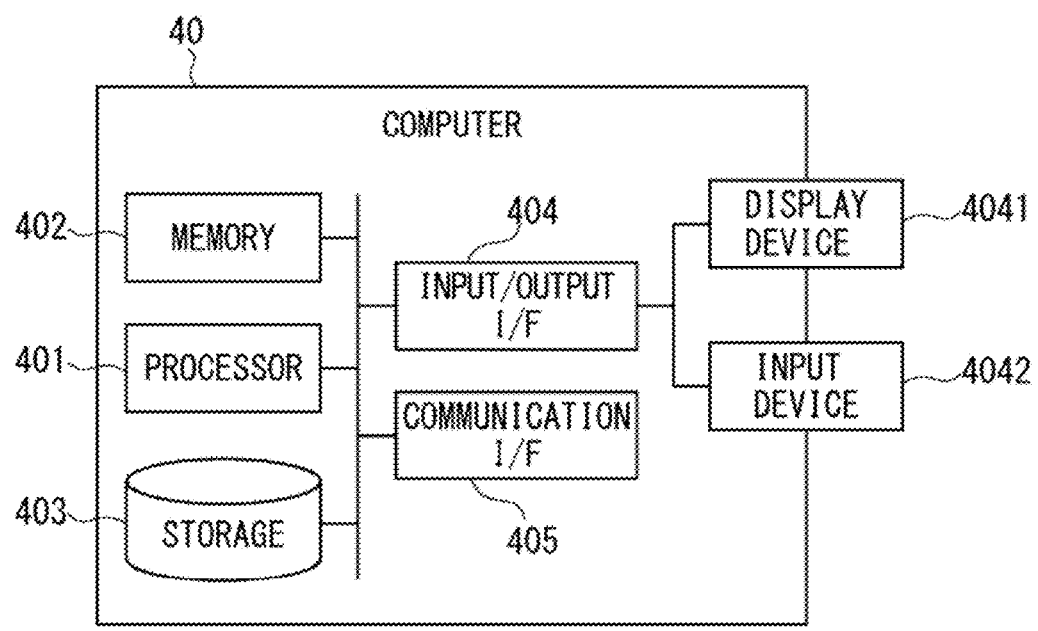
FIG. 12 is a block diagram illustrating an example of a hardware configuration of a computer that implements a monitoring device according to the example embodiment.

As illustrated in FIG. 12, the computer 40 includes a processor 401, a memory 402, a storage 403, an input/output interface (input/output I/F) 404, and a communication interface (communication I/F) 405, for example. The processor 401, the memory 402, the storage 403, the input/output interface 404, and the communication interface 405 are connected to each other by a data transmission line for transmitting and receiving data therebetween.

The processor 401 is an arithmetic operation processing device, such as a central processing unit (CPU) or a graphics processing unit (GPU), for example. The memory 402 is a memory, such as a random-access memory (RAM) or a read-only memory (ROM), for example. The storage 403 is a storage device, such as a hard-disk drive (HDD), a solid-state drive (SSD), or a memory card, for example. The storage 403 may also be a memory, such as a RAM or a ROM.

The storage 403 stores programs for implementing the functions of the optical fiber sensing unit 31 and the analyzing unit 32 included in the monitoring device 30. The processor 401 executes these programs and thus implements each function of the optical fiber sensing unit 31 and the analyzing unit 32. When the processor 401 executes these programs, the processor 401 may execute the programs upon loading them onto the memory 402 or execute the programs without loading them onto the memory 402. The memory 402 or the storage 403 also serves to store information or data held by the optical fiber sensing unit 31 and the analyzing unit 32.

These programs can be stored by use of various types of non-transitory computer-readable media and supplied to a computer (including the computer 40). The non-transitory computer-readable media include various types of tangible storage media. Examples of the non-transitory computer-readable media include a magnetic storage medium (e.g., a flexible disk, a magnetic tape, a hard-disk drive), an optical magnetic storage medium (e.g., a magneto-optical disk), a compact disc-ROM (CD-ROM), a CD-recordable (CD-R), a CD-rewritable (CD-R/W), and a semiconductor memory (e.g., a mask ROM, a programmable ROM (PROM), an erasable PROM (EPROM), a flash ROM, a RAM). The programs may also be supplied to a computer in the form of various types of transitory computer-readable media. Examples of the transitory computer-readable media include an electric signal, an optical signal, and an electromagnetic wave. The transitory computer-readable media can supply the programs to a computer via a wired communication line, such as an electric wire or an optical fiber, or via a wireless communication line.

The input/output interface 404 is connected to a display device 4041 and an input device 4042, for example. The display device 4041 is a device, such as a liquid-crystal display (LCD) or a cathode-ray tube (CRT) display, that displays a screen corresponding to drawing data processed by the processor 401. The input device 4042 is a device that receives an operator's operation input. The input device 4042 is, for example but not limited to, a keyboard, a mouse, or a touch sensor. The display device 4041 and the input device 4042 may be integrated and implemented in the form of a touch panel. The computer 40 may include a sensor (not illustrated), such as a distributed vibration sensor, and this sensor may be connected to the input/output interface 404.

The communication interface 405 transmits and receives data to and from an external device. For example, the communication interface 405 communicates with an external device via a wired communication line or a wireless communication line.

Operation of Example Embodiment

Now, with reference to FIG. 13, a general flow of an operation of the monitoring system according to the present example embodiment will be described. In the flow of the operation illustrated in FIG. 13, the optical fiber sensing unit 31 continuously performs an operation of inputting pulsed light to the optical fiber 10 laid in a monitoring area and receiving backscattering light from the optical fiber 10 or starts such an operation before step S21.

Figure 13:
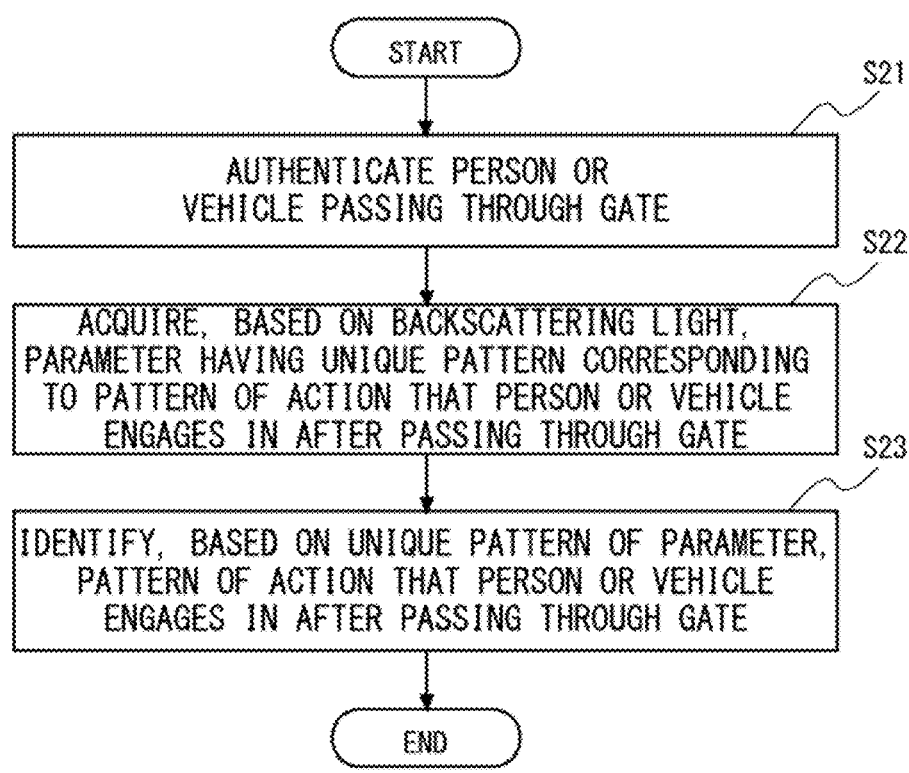
FIG. 13 is a flowchart illustrating an example of a flow of an operation of the monitoring system according to the example embodiment.

As illustrated in FIG. 13, first, the authenticating unit 20 authenticates a person or a vehicle passing through the gate G for entering the monitoring area (step S21).

Next, based on the backscattering light received from the optical fiber 10, the optical fiber sensing unit 31 acquires a parameter (e.g., vibration data, acoustic data, temperature data, or the like) having a unique parameter corresponding to a pattern of action that the person or the vehicle authenticated by the authenticating unit 20 engages in after passing through the gate G (step S22).

Thereafter, based on the unique pattern of the parameter, the analyzing unit 32 identifies a pattern of action that the person or the vehicle authenticated by the authenticating unit 20 engages in after passing through the gate G (step S23). At this point, the analyzing unit 32 may identify a pattern of action that the person or the vehicle engages in after passing through the gate G by use of any of the methods A1 to A8 described above.

Figure 14:
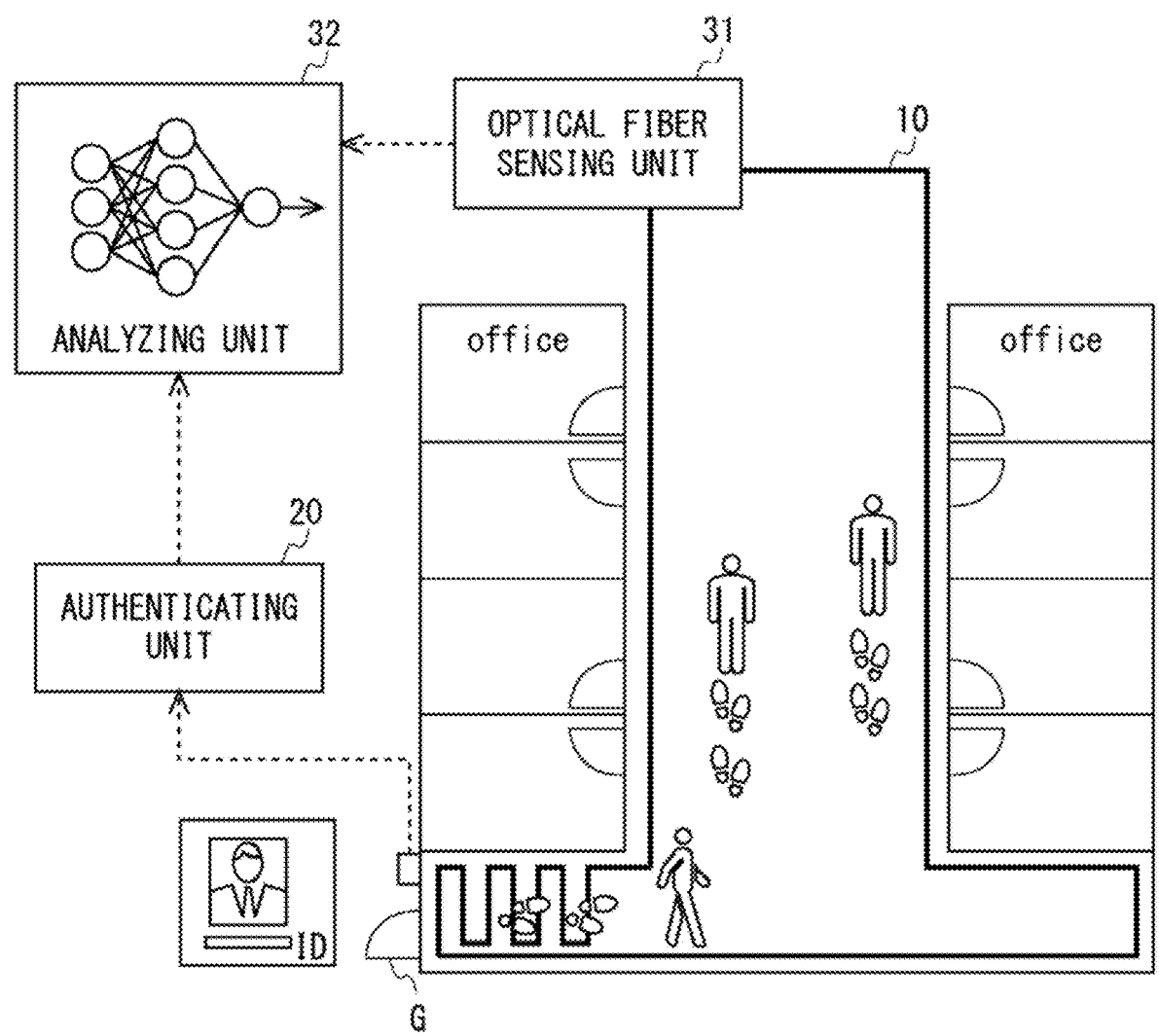
FIG. 14 illustrates an example of a specific use case of the monitoring system according to the example embodiment.

Next, with reference to FIG. 14, a specific use case of the monitoring system according to the present example embodiment will be described. FIG. 14 illustrates an example case where the target to be monitored on an office floor serving as a monitoring area is a person. In addition, in the example illustrated in FIG. 14, a pattern of action of the person to be monitored is identified based on the unique pattern of vibration data of vibrations produced on the floor serving as the monitoring area.

As illustrated in FIG. 14, first, the authenticating unit 20 authenticates a person passing through the gate G for entering the floor serving as the monitoring area and acquires authentication information indicating the authenticated person. Then, the authenticating unit 20 transmits, to the analyzing unit 32, the authentication information, time information, and so on along with a notification indicating that the authentication has been performed. In this example, the authenticating unit 20 performs card key-based ID authentication, for example. In addition, the authenticating unit 20 acquires, for example, the person's name as the authentication information.

The analyzing unit 32 starts tracking the action that the person engages in after passing through the gate G, triggered upon receiving the above-described notification from the authenticating unit 20.

Specifically, the analyzing unit 32 acquires vibration data of vibrations produced in the monitoring area after the person has passed through the gate G from the optical fiber sensing unit 31 and analyzes the dynamic change of the unique pattern of the acquired vibration data. Thus, the analyzing unit 32 identifies the pattern of action that the person engages in after passing through the gate G. In this example, the analyzing unit 32 identifies the pattern of action by use of an initial training model trained in advance through the method A7 described above, for example.

Thereafter, the analyzing unit 32 records, into a database, the identified pattern of action that the person engages in after passing through the gate G with the identified pattern of action associated with the authentication information transmitted along with the above-described notification from the authenticating unit 20. In this example, the analyzing unit 32 records the pattern of action into the database with the pattern of action associated with the authentication information as illustrated in FIG. 3, for example.

In this example, in response to the authenticating unit 20 authenticating a person who has passed through the gate G, the analyzing unit 32 may extract a pattern of action associated with the authentication information of the person who has passed through the gate G from the database and sound an alarm if the pattern of action that the person who has passed through the gate G engaged in thereafter fails to match the pattern of action extracted from the database.

Moreover, in response to the authenticating unit 20 authenticating a person who has passed through the gate G, the analyzing unit 32 may sound an alarm, notify a guardhouse, or regulate the access to the monitoring area by locking the gate G if a pattern of action associated with the authentication information of the person who has passed through the gate G is not recorded in the database. In this case, the analyzing unit 32 may start tracking a person after the security of the person who has passed through the gate G has been confirmed and the alarm or the like has been disabled afterward. Then, the analyzing unit 32 may record a pattern of action identified of that person into the database with the pattern of action associated with the authentication information received from the authenticating unit 20.

Specific conceivable use cases of the monitoring system according to the present example embodiment include, aside from the example illustrated in FIG. 14, various cases such as a case where the monitoring area is the inside of an unmanned convenience store, for example.

Advantageous Effects of Example Embodiment

As described above, according to the present example embodiment, the authenticating unit 20 authenticates a person or a vehicle passing through the gate G for entering a monitoring area. Based on backscattering light (optical signal) received from the optical fiber 10 laid in the monitoring area, the optical fiber sensing unit 31 acquires a parameter (e.g., vibration data, acoustic data, temperature data, or the like) having a unique pattern corresponding to a pattern of action of the person or the vehicle authenticated by the authenticating unit 20. The analyzing unit 32 identifies a pattern of action of the person or the vehicle authenticated by the authenticating unit 20 based on the unique pattern of the parameter. This configuration makes it possible to identify more specifically a pattern of action that a person or a vehicle engages in after passing through the gate G.

According to the present example embodiment, as described above, the analyzing unit 32 identifies a pattern of action of a person or a vehicle authenticated by the authenticating unit 20 based on the unique pattern of a parameter. In other words, the analyzing unit 32, for example, identifies a pattern of action of a person or a vehicle by dynamically analyzing the pattern of the change of the parameter (e.g., a change in the varying intensity of the vibrations), instead of identifying a pattern of action based on a rough standard, such as the magnitude of the vibrations (e.g., identifying a pattern of action based on large vibrations and a high number of vibrations). This configuration makes it possible to identify with higher accuracy a pattern of action that a person or a vehicle engages in after passing through the gate G.

According to the present example embodiment, the analyzing unit 32 identifies a pattern of action that a person or a vehicle engages in after passing through the gate G and records the identified pattern of action into a database with the identified pattern of action associated with authentication information acquired when the person or the vehicle is authenticated. This configuration makes it possible to achieve various application services cooperating with the gate G. For example, the above configuration can provide a service where an alarm goes off when the pattern of action that a person or a vehicle engages in after passing through the gate G fails to match the patterns of actions recorded in a database.

According to the present example embodiment, an optical fiber sensing technology where the optical fiber 10 is used as a sensor is utilized. This can provide such advantages that the sensing is not affected by electromagnetic noise, no power needs to be fed to the sensor, the technology excels in the environment resistance, or the maintenance becomes easier.

Thus far, the present disclosure has been described with reference to an example embodiment, but the present disclosure is not limited by the example embodiment described above. Various modifications that a person skilled in the art can appreciate can be made to the configurations and the details of the present disclosure within the scope of the present disclosure.

For example, a pattern of action identified of a person or a vehicle that has passed through the gate G is recorded in a database according to the foregoing example embodiment, but this is not a limiting example. A database may record the unique pattern itself of a parameter, such as vibrations, a sound, or a temperature, produced in the monitoring area after the person or the vehicle has passed through the gate G. In this case, the alarm may go off when the unique pattern of the parameter produced in the monitoring area after a person or a vehicle has passed through the gate G fails to match the unique patterns recorded in the database.

The whole or part of the embodiments disclosed above can be described as, but not limited to, the following supplementary notes.

(Supplementary Note 1)
  A monitoring system comprising:
    an optical fiber laid in a monitoring area;
    an authenticating unit configured to authenticate a person or a vehicle passing through a gate for entering the monitoring area;
    an optical fiber sensing unit configured to acquire, based on an optical signal received from the optical fiber, a parameter having a unique pattern corresponding to a pattern of action of the authenticated person or vehicle; and
    an analyzing unit configured to identify the pattern of action of the authenticated person or vehicle based on the unique pattern of the parameter.

(Supplementary Note 2)
  The monitoring system according to Supplementary note 1, wherein the analyzing unit is configured to
    identify, if the authenticating unit has authenticated a person, a movement path and a gait of the authenticated person as the pattern of action of the authenticated person, or
    identify, if the authenticating unit has authenticated a vehicle, a movement path of the authenticated vehicle as the pattern of action of the authenticated vehicle.

(Supplementary Note 3)
  The monitoring system according to Supplementary note 1 or 2, wherein the analyzing unit is configured to
    acquire, from the authenticating unit, authentication information indicating the authenticated person or vehicle, and
    record, into a database, the identified pattern of action of the authenticated person or vehicle associated with the authentication information.

(Supplementary Note 4)
  The monitoring system according to Supplementary note 3, wherein the analyzing unit is configured to
    extract, if the authenticating unit has authenticated a person or a vehicle, the pattern of action associated with the authentication information of the authenticated person or vehicle from the database, and
    sound an alarm if the pattern of action identified of the authenticated person or vehicle fails to match the pattern of action extracted from the database.

(Supplementary Note 5)
  The monitoring system according to Supplementary note 3 or 4, wherein the analyzing unit is configured to, if the authenticating unit has authenticated a person or a vehicle, sound an alarm if the pattern of action associated with the authentication information of the authenticated person or vehicle is not recorded in the database.

(Supplementary Note 6)
  The monitoring system according to any one of Supplementary notes 1 to 5, wherein the parameter includes vibration data of a vibration produced in the monitoring area.

(Supplementary Note 7)
  A monitoring device comprising:
    an optical fiber sensing unit configured to acquire, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and
    an analyzing unit configured to identify the pattern of action of the authenticated person or vehicle based on the unique pattern of the parameter.

(Supplementary Note 8)
  The monitoring device according to Supplementary note 7, wherein the analyzing unit is configured to
    identify, if the authenticating unit has authenticated a person, a movement path and a gait of the authenticated person as the pattern of action of the authenticated person, or
    identify, if the authenticating unit has authenticated a vehicle, a movement path of the authenticated vehicle as the pattern of action of the authenticated vehicle.

(Supplementary Note 9)
  The monitoring device according to Supplementary note 7 or 8, wherein the analyzing unit is configured to
    acquire, from the authenticating unit, authentication information indicating the authenticated person or vehicle, and
    record, into a database, the identified pattern of action of the authenticated person or vehicle associated with the authentication information.

(Supplementary Note 10)
  The monitoring device according to Supplementary note 9, wherein the analyzing unit is configured to
    extract, if the authenticating unit has authenticated a person or a vehicle, the pattern of action associated with the authentication information of the authenticated person or vehicle from the database, and
    sound an alarm if the pattern of action identified of the authenticated person or vehicle fails to match the pattern of action extracted from the database.

(Supplementary Note 11)
  The monitoring device according to Supplementary note 9 or 10, wherein the analyzing unit is configured to, if the authenticating unit has authenticated a person or a vehicle, sound an alarm if the pattern of action associated with the authentication information of the authenticated person or vehicle is not recorded in the database.

(Supplementary Note 12)
  The monitoring device according to any one of Supplementary notes 7 to 11, wherein the parameter includes vibration data of a vibration produced in the monitoring area.

(Supplementary Note 13)
  A monitoring method to be performed by a monitoring device, the monitoring method comprising:
    a step of acquiring, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and a step of identifying the pattern of action of the authenticated person or vehicle based on the unique pattern of the parameter.

(Supplementary Note 14)

A non-transitory computer-readable medium storing a program that causes a computer to execute:
 a procedure of acquiring, based on an optical signal received from an optical fiber laid in a monitoring area, a parameter having a unique pattern corresponding to a pattern of action of a person or a vehicle that is passing through a gate for entering the monitoring area and that has been authenticated by an authenticating unit; and
 a procedure of identifying the pattern of action of the authenticated person or vehicle based on the unique pattern of the parameter.

This application claims priority to Japanese Patent Application No. 2019-068645, filed on Mar. 29, 2019, the entire disclosure of which is incorporated herein.

REFERENCE SIGNS LIST 10 optical fiber
20 authenticating unit
30 monitoring device
31 optical fiber sensing unit
32 analyzing unit
40 computer
401 processor
402 memory
403 storage
404 input/output interface
4041 display device
4042 input device
405 communication interface
G gate

What is claimed is:

1. A monitoring system comprising:
 an optical fiber laid in a monitoring area;
 an authenticating unit configured to authenticate a person or vehicle passing through a gate for entering the monitoring area;
 an optical fiber sensing unit configured to acquire, based on an optical signal received from the optical fiber, a parameter having a unique pattern corresponding to a pattern of action of the authenticated person or vehicle; and
 an analyzing unit configured to identify the pattern of action of the authenticated person or vehicle based on the unique pattern of the parameter.

2. The monitoring system according to claim 1, wherein the analyzing unit is configured to
 identify, if the authenticating unit has authenticated a person, a movement path and a gait of the authenticated person as the pattern of action of the authenticated person, or
 identify, if the authenticating unit has authenticated a vehicle, a movement path of the authenticated vehicle as the pattern of action of the authenticated vehicle.

3. The monitoring system according to claim 1, wherein the analyzing unit is configured to
 acquire, from the authenticating unit, authentication information indicating the authenticated person or vehicle, and
 record, into a database, the identified pattern of action of the authenticated person or vehicle associated with the authentication information.

4. The monitoring system according to claim 3, wherein the analyzing unit is configured to
 extract, if the authenticating unit has authenticated the person or vehicle, the pattern of action associated with the authentication information of the authenticated person or vehicle from the database, and
 sound an alarm if the pattern of action identified of the authenticated person or vehicle fails to match the pattern of action extracted from the database.

5. The monitoring system according to claim 3, wherein the analyzing unit is configured to, if the authenticating unit has authenticated the person or vehicle, sound an alarm if the pattern of action associated with the authentication information of the authenticated person or vehicle is not recorded in the database.

6. The monitoring system according to claim 1, wherein the parameter includes vibration data of a vibration produced in the monitoring area.

7. A monitoring device comprising:
 an optical fiber sensing unit configured to acquire, based on an optical signal received from an optical fiber laid in a monitoring area, a parameter having a unique pattern corresponding to a pattern of action of a person or vehicle that is passing through a gate for entering the monitoring area and that has been authenticated by an authenticating unit; and
 an analyzing unit configured to identify the pattern of action of the authenticated person or vehicle based on the unique pattern of the parameter.

8. The monitoring device according to claim 7, wherein the analyzing unit is configured to
 identify, if the authenticating unit has authenticated a person, a movement path and a gait of the authenticated person as the pattern of action of the authenticated person, or
 identify, if the authenticating unit has authenticated a vehicle, a movement path of the authenticated vehicle as the pattern of action of the authenticated vehicle.

9. The monitoring device according to claim 7, wherein the analyzing unit is configured to
 acquire, from the authenticating unit, authentication information indicating the authenticated person or vehicle, and
 record, into a database, the identified pattern of action of the authenticated person or vehicle associated with the authentication information.

10. The monitoring device according to claim 9, wherein the analyzing unit is configured to
 extract, if the authenticating unit has authenticated the person or vehicle, the pattern of action associated with the authentication information of the authenticated person or vehicle from the database, and
 sound an alarm if the pattern of action identified of the authenticated person or vehicle fails to match the pattern of action extracted from the database.

11. The monitoring device according to claim 9, wherein the analyzing unit is configured to, if the authenticating unit has authenticated the person or a vehicle, sound an alarm if the pattern of action associated with the authentication information of the authenticated person or vehicle is not recorded in the database.

12. The monitoring device according to claim 7, wherein the parameter includes vibration data of a vibration produced in the monitoring area.

13. A monitoring method to be performed by a monitoring device, the monitoring method comprising:
- a step of acquiring, based on an optical signal received from an optical fiber laid in a monitoring area, a parameter having a unique pattern corresponding to a pattern of action of a person or vehicle that is passing through a gate for entering the monitoring area and that has been authenticated by an authenticating unit; and
- a step of identifying the pattern of action of the authenticated person or vehicle based on the unique pattern of the parameter.

* * * * *